United States Patent [11] 3,622,534

[72] Inventors Robert D. Timmons
 Tinley Park;
 Roy J. Betty, Jr., Chicago, both of Ill.
[21] Appl. No. 740,786
[22] Filed June 27, 1968
[45] Patented Nov. 23, 1971
[73] Assignee Armour Industrial Chemical Company
 Chicago, Ill.

[54] GELLED ELASTOMER COMPOSITIONS
 16 Claims, No Drawings
[52] U.S. Cl. .................................................. 260/32.8 A,
 252/316, 260/33.2 R, 260/33.6 A, 260/33.8 UA,
 260/553 R, 260/553 A
[51] Int. Cl. ........................................................ C08d 9/00
[50] Field of Search........................................... 252/316;
 260/32.8 A, 553, 553 A, 33.6 A, 33.2 R, 33.8 UA

[56] References Cited
UNITED STATES PATENTS

| | | | |
|---|---|---|---|
| 2,882,259 | 4/1959 | Graham.......................... | 260/32.8 N |
| 2,925,387 | 2/1960 | Traise et al. ................... | 260/553 A |
| 3,242,210 | 3/1966 | Dreher et al................... | 260/553 |
| 3,350,342 | 10/1967 | Begley........................... | 260/33.6 A |
| 3,358,005 | 12/1967 | Garber et al................... | 260/553 |
| 3,478,127 | 11/1969 | Petersen........................ | 260/33.6 A |

Primary Examiner—Morris Liebman
Assistant Examiner—H. H. Fletcher
Attorney—Francis W. Young ABSTRACT: Thickened elastomer compositions comprising a synthetic elastomer such as butyl or neoprene rubber, elastomeric solvent such as textile spirits and a di-substituted urea such as that formed by the in situ reaction of a long chain aliphatic amine and isocyanate, which are useful as rubber adhesives, sealants, and coatings.

GELLED ELASTOMER COMPOSITIONS

Rubber and elastomer compositions, such as those employing butyl rubber or neoprene, have been used in the past as rubber adhesives, cements and sealants. Such compositions are widely used for bonding flexible materials like paper, textiles, leather and rubber to rigid materials like metals, plastics and ceramic materials. One serious drawback of known compositions is that when applied to nonhorizontal surfaces, the composition is of such a viscosity that it sags or runs. Another disadvantage is encountered when solvents such as mineral spirits are employed in the compositions. The solvents are generally quite volatile and change viscosity of the composition as the solvent evaporates, thus requiring close control of the composition and its application.

This invention therefore is directed to compositions which overcome many of the disadvantages experienced with prior art materials, including the above objections. The invention provides compositions, which can be used as coatings, adhesives, cements, sealants, and the like, having thixotropic properties. This is the characteristic of certain gels to become fluid or less viscous upon agitation and then return to their normal highly viscous condition upon standing. More specifically, this invention is directed toward thickened elastomer compositions comprising synthetic elastomer material, elastomeric solvent and a minor proportion of adi-substituted urea hereinafter called "urea" preferably such as that formed by the in situ reaction of an amine and isocyanate.

Thus, it is an object of this invention to provide novel gelled synthetic elastomer compositions which can be readily formulated under field conditions to provide stable compositions of various viscosities. Another object is to provide elastomer compositions which can be applied onto nonhorizontal surfaces without exhibiting sag. Still another object is to provide elastomer compositions which form stable invert emulsions in water. The thixotropic gelled synthetic elastomer composition of our invention comprises synthetic elastomer material, elastomeric solvent, and urea preferably produced by the in situ reaction of an aliphatic amine and an isocyanate selected from the group consisting of aromatic and aliphatic mono- and polyisocyanates. Mixtures of amines and mono- and polyisocyanates can be used. The amine terminated structure is preferred.

Aliphatic amino compounds are preferred amine reactants, especially those containing an aliphatic group of about 6 to 22 carbon atoms attached to an amino nitrogen. Such aliphatic groups may be branched or straight hydrocarbon chain, saturated or olefinically unsaturated, cyclic, or aralkyl such as 9,10-phenylstearyl such as derived from oleic acid. Primary mono-amines are preferred; and N-secondary-alkyl amines are particularly preferred due to their low melting points thereby providing amines having fluid properties under field conditions, and due to their characteristic of maintaining controllable viscosity in the compositions of the invention. Such amines can be produced by amidation of olefins in hydrogen fluoride followed by conversion of the amide to amine. These amines are generally isomeric compositions with respect to the attachment of nitrogen to the aliphatic chain, and are of chain lengths reflecting the olefin cut used as a reactant. The secondary-alkyl amines may be represented by the general formula;

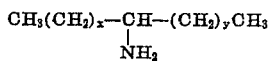

wherein $x$ and $y$ are integers having a sum from about three to 19. A preferred subclass is N-secondary-alkyl amines that are mixtures of hydrocarbon chain lengths having from about six to 22 carbon atoms. Amines of this class are commercially available in chain lengths of $C_{7-9}$, $C_{9-11}$, $C_{11-14}$ and $C_{15-20}$ (ARMEEN primary Beta-amines, Armour Industrial Chemical Company). Mixtures of the foregoing amines may be employed.

Isocyanates suitable for employment in this invention include those isocyanates that react with an amine to form urea. Long chain aliphatic isocyanates wherein the aliphatic group contains from about six to 22 carbon atoms are desirable. It is preferred to use difunctional isocyanates, or prepolymers thereof, selected from the group consisting of aromatic diisocyanates such as toluene diisocyanate, aliphatic diisocyanates such as hexamethylene diisocyanate and the long chain aliphatic diisocyanates such as are derived from aminostearylamine and aminomethylstearylamine. Toluene diisocyanate is particularly preferred in forming the compositions, and commercial toluene diisocyanate which is generally a mixture of tolyl 2,4- and 2,6- has been used with excellent results.

Suitable compositions according to the invention may be formulated using minor amounts of urea, and from about 2 to 10 weight percent urea formed in situ from the amine and isocyanate is preferred. Urea may simply be added to the elastomer and elastomeric solvent. Especially preferable compositions contain from 4 to 8 weight percent urea. The optimum concentration of urea will vary depending upon the type of elastomer material and solvent utilized, and the particular thickening properties desired. For example, at lower concentrations of urea the products generally exhibit soft, firm gels. At the higher concentrations of urea, the products generally form hard, firm gels.

Elastomers suitable for use in this invention include those elastomers having the properties of natural, reclaimed, vulcanized or synthetic rubber. One preferred subclass is synthetic elastomers produced by polymerization of butadiene alone or with isobutylene. Copolymers of butadiene and isobutylene, formerly known as butyl rubber and now also known as GR–I, are preferred. Another preferred subclass is the synthetic elastomers produced by polymerization of chloroprene. Chloroprene polymers by the polymerization of 2-chloro-1,3-butadiene made by the reaction of hydrogen chloride on monovinylacetate are especially preferred. Such copolymers are known as neoprene and also termed GR–M.

A wide variety of organic elastomer solvents are suitable for use in the compositions of this invention including petroleum distillates, kerosene, fuel oils, mineral spirits, gasoline, turpentine, textile spirits, naphtha, benzene, toluene, carbon tetrachloride, methylisobutylketone, methyl-Cellosolve (ethylene glycol monomethyl ether) and the like. The choice of a particular solvent is dependent upon the rate of cure desired and nature of elastomer material utilized. For example, more volatile solvents are selected for rapid vulcanization properties. A particularly preferred solvent is textile spirits. The compositions of the invention may contain from about 30 to 95 weight percent of solvent materials and from about 40 to 60 percent is preferred.

The gelled synthetic elastomer-cutback compositions may also contain other additives that do not interfere with urea forming reactions, such as wetting agents and additional adhesion agents.

The compositions of this invention may be readily formulated from elastomer-cutbacks well known in the art to be made by addition of solvent to elastomer material with mixing. The thixotropic compositions can be formulated by simply adding urea or by mixing of the amine and isocyanate reactants in the elastomer-cutback composition to form urea in situ. In the latter mode, it is preferred to add the amine first and then add the isocyanate with stirring. In forming the urea, it is suitable to use from the stoichiometric requirement of amine and isocyanate to about 40 percent excess of amine. That is, the mole ration of amine to diisocyanate for example may range from about 2:1 to 2.8:1. The compositions of the invention may be formulated in batches by simple mixing in tanks, and stored for use as desired. Such compositions are stable over long periods of time. They may also be formulated on a continuous basis, such as may be desired in spraying applications, by introducing appropriate quantities of amine and isocyanate into the elastomer latex-solvent flow in a pipe leading to the spray nozzle.

The compositions may be applied directly by spraying or caulking, or as invert aqueous emulsions. The compositions form stable invert emulsions when about 8 to 10 weight percent water is added. Such emulsions are especially useful in adhesive and sealant applications.

The following specific examples are presented to further illustrate this invention, and are not to be construed in any way or manner as imposing limitations upon the scope thereof.

EXAMPLE I

Thickened synthetic elastomer compositions were formulated using 60 weight percent of butyl rubber latex and 40 weight percent textile spirits (American Mineral Spirits Co.). The textile spirits solvent and elastomer were stirred until a uniform viscosity was obtained. Then the amine noted in table I was added with stirring, followed by the addition of toluene diisocyanate to produce the concentration of urea and mole ratios noted in table I and Table II. Stirring was continued until maximum thickening was obtained. After aging for one week, the gels in each case had the appearance noted in table I and Table II. The thickened synthetic elastomer compositions formulated in this fashion exhibited good stability.

EXAMPLE II

Using a procedure as set forth in example I, 60 weight percent butyl rubber was combined with 40 weight percent of textile spirits. Urea in situ was formed therein at 4 weight percent concentration. The result was a stable thickened synthetic elastomer gel of medium firmness exhibiting good stability and excellent properties as a crack sealer.

While this invention has been described with respect to specific embodiments of thickened elastomer compositions and processes, it is not so limited. It is to be understood that variations and modifications thereof obvious to those skilled in the art may be made without departing from the spirit or scope of this invention.

What is claimed is:

1. A thickened elastomer composition comprising; synthetic elastomer selected from the group consisting of butyl and neoprene rubbers; about 30 to 95 weight percent of an organic solvent for said elastomer; and about 2 to 10 weight percent of di-substituted urea produced by the in situ reaction of an aliphatic hydrocarbon primary monoamine and diisocyanate selected from the group consisting of aromatic diisocyanates TABLE I.—THICKENED ELASTOMER GELS AMINE-TOLUENE DIISOCYANATE (TDI) MOLE RATIO 2:1

| Amine | Total amine-TDI concentration, percent | Time of gelation | Gel appearance | |
|---|---|---|---|---|
| | | | Initial | After aging |
| N-sec-alkyl ($C_{7-9}$) primary amine | .5 | 5 sec | Viscous slight gel | Viscous slight gel. |
| Do | 2.0 | 5 sec | do | Do. |
| Do | 4.0 | 5 sec | Soft firm gel | Soft firm gel. |
| Do | 7.0 | 5 sec | do | Do. |
| Do | 10.0 | 5 sec | do | Do. |
| N-sec-alkyl ($C_{9-11}$) primary amine | .5 | | Fluid | Fluid. |
| Do | 2.0 | 5 min | Thick viscous gel | Soft firm gel. |
| Do | 4.0 | 5 sec | Soft firm gel | Do. |
| Do | 7.0 | 5 sec | do | Do. |
| Do | 10.0 | 5 sec | do | Do. |
| N-sec-alkyl ($C_{11-14}$) primary amine | .5 | | Fluid | Fluid. |
| Do | 2.0 | 5 min | Soft firm gel | Soft firm gel. |
| Do | 4.0 | 5 min | do | Do. |
| Do | 7.0 | 5 sec | Firm gel | Hard firm gel. |
| Do | 10.0 | 5 sec | do | Do. |
| N-sec-alkyl ($C_{15-19}$) primary amine | .5 | | Fluid | Fluid. |
| Do | 2.0 | | Slightly viscous fluid | Heavy viscous fluid. |
| Do | 4.0 | 5 min | Slightly viscous gel | Soft firm gel. |
| Do | 7.0 | 5 min | Soft firm gel | Do. |
| Do | 10.0 | 5 min | do | Hard firm gel. |
| N-cocoamine | .5 | | Fluid | Fluid. |
| Do | 2.0 | 5 min | Soft firm gel | Soft firm gel. |
| Do | 4.0 | 5 min | do | Do. |
| Do | 7.0 | 5 sec | Firm gel | Hard firm gel. |
| Do | 10.0 | 5 sec | do | Do. |

TABLE II.—THICKENED ELASTOMER GELS AMINE-TOLUENE DIISOCYANATE (TDI) MOLE RATIO 2.4:1

| Amine | Total amine-TDI concentration, percent | Time of gelation | Gel appearance | |
|---|---|---|---|---|
| | | | Initial | After aging |
| N-sec-alkyl ($V_{7-9}$) primary amine | .5 | | Fluid (white precipitate.) | Fluid (white precipitate). |
| Do | 2.0 | 5 min | Viscous fluid | Slightly viscous fluid. |
| Do | 4.0 | 5 min | Soft firm gel | Soft firm gel. |
| Do | 7.0 | 5 min | do | Do. |
| Do | 10.0 | 5 sec | do | Do. |
| N-sec-alkyl ($C_{9-11}$) primary amine | .5 | 5 min | Viscous gel | Viscous gel. |
| Do | 2.0 | 5 min | Soft firm gel | Soft viscous gel. |
| Do | 4.0 | 5 sec | do | Soft firm gel. |
| Do | 7.0 | 5 sec | do | Do. |
| Do | 10.0 | 5 sec | do | Hard firm gel. |
| N-sec-alkyl ($C_{11-14}$) primary amine | .5 | | Fluid | Fluid. |
| Do | 2.0 | 5 min | Soft firm gel | Soft firm gel. |
| Do | 4.0 | 5 sec | do | Do. |
| Do | 7.0 | 5 sec | do | Do. |
| Do | 10.0 | 5 sec | do | Hard firm gel. |
| N-sec-alkyl ($C_{15-19}$) primary amine | .5 | | Fluid | Fluid. |
| Do | 2.0 | 5 min | Slightly viscous fluid | Soft slight gel. |
| Do | 4.0 | 5 sec | Soft firm gel | Soft firm gel. |
| Do | 7.0 | 5 sec | do | Do. |
| Do | 10.0 | 5 sec | do | Hard firm gel. |
| N-cocoamine | .5 | 5 min | Soft semi-viscous gel | Soft viscous gel. |
| Do | 2.0 | 5 min | Soft firm gel | Soft firm gel. |
| Do | 4.0 | 5 min | do | Do. |
| Do | 7.0 | 5 sec | Firm gel | Hard firm gel. |
| Do | 10.0 | 5 sec | do | Do. | and aliphatic diisocyanates wherein the aliphatic group contains about six to 22 carbon atoms, said amine added in the mole ratio of amine to diisocyanate of from 2:1 to 2.8:1.

2. The composition of claim 1 wherein said amine has an aliphatic group containing from six to 22 carbon atoms and is selected from the group consisting of branched and straight hydrocarbon chain, saturated and olefinically unsaturated, cyclic and aralkyl.

3. The composition of claim 2 wherein said amine is an N-secondary-alkyl amine having the general formula:

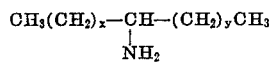

wherein $x$ and $y$ are integers having a sum from about three to 19

4. The composition of claim 1 wherein said diisocyanate is toluene diisocyanate.

5. The composition of claim 1 wherein said monoamine has from six to 22 carbon atoms and said diisocyanate is toluene diisocyanate.

6. The composition of claim 5, said amine being an N-secondary-alkyl primary amine.

7. The composition of claim 1 wherein said solvent is present in about 40 to 60 weight percent.

8. The composition of claim 1 wherein said di-substituted urea is present in about 4 to 8 weight percent.

9. The composition of claim 1 wherein said solvent is selected from the group consisting of petroleum distillates, kerosene, fuel oils, mineral spirits, gasoline, turpentine, textile spirits, naphtha, benzene, toluene, carbon tetrachloride, methylisobutyl-ketone, and ethylene glycol monomethyl ether.

10. A process for producing thickened elastomer compositions comprising; mixing synthetic elastomer selected from the group consisting of butyl and neoprene rubbers with about 30 to 95 weight percent of an organic solvent for said elastomer; and adding thereto an aliphatic hydrocarbon monoamine and diisocyanate selected from the group consisting of aromatic diisocyanates and aliphatic diisocyanates wherein the aliphatic group contains about six to 22 carbon atoms, said amine and diisocyanate added in the mole ratio of from 2:1 to 2.8:1 to produce in situ about 2 to 10 weight percent of di-substituted urea.

11. The process of claim 10, said solvent being selected from the group consisting of petroleum distillates, kerosene, fuel oils, mineral spirits, gasoline, turpentine, textile spirits, naphtha, benzene, toluene, carbon tetrachloride, methylisobutylketone, ethylene glycol monomethyl ether.

12. The process of claim 10, said solvent being present in from 40–60 weight percent.

13. The process of claim 10, said urea being present in from 4–8 weight percent.

14. The process of claim 10, said amine being added with stirring, and then said isocyanate being added with stirring.

15. The process of claim 10, said amine being an N-secondary-alkyl amine having the general formula:

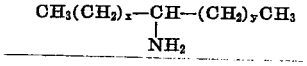

wherein $x$ and $y$ are integers having a sum from about three to 19.

16. The process of claim 10 wherein said monoamine has from six to 22 carbon atoms and said diisocyanate is toluene diisocyanate.

* * * * *